Sept. 16, 1969     E. J. GIBSON ET AL     3,467,590

ION-SENSITIVE ELECTRODE STRUCTURE

Filed June 22, 1966

INVENTORS
EDWARD J. GIBSON
STANLEY L. SHILLER
BY JOHN H. RISEMAN

*Robert J. Schiller*

ATTORNEYS

United States Patent Office 3,467,590
Patented Sept. 16, 1969

3,467,590
ION-SENSITIVE ELECTRODE STRUCTURE
Edward J. Gibson, Billerica, Stanley L. Shiller, Needham, and John H. Riseman, Cambridge, Mass., assignors to Orion Research, Inc., Cambridge, Mass., a corporation of Massachusetts
Filed June 22, 1966, Ser. No. 559,466
Int. Cl. B01k *3/10, 3/04*
U.S. Cl. 204—195                                      9 Claims

ABSTRACT OF THE DISCLOSURE

An electrochemical electrode of the potentiometric type employing ion-exchanger liquid to provide an ion-sensitive interface with a solution under test. The electrode has an elongated body enclosing two reservoirs, one for the ion-exchanger liquid, the other for a reference solution in which a reference electrode is disposed. A membrane with an interconnected porous structure disposed across an aperture in the body such that the porous structure provides the only liquid path between the reservoirs, one surface of that portion of the membrane across the aperture contacting the ion-exchanger liquid, the opposite surface being intended to contact the solution under test. Because the membrane is preferentially wettable by the ion-exchanger liquid, the latter fills the pores of the membrane which also serves to wick the liquid from its reservoir.

---

This application relates to electrochemical analytical devices and more particularly to an improved electrode structure for electrochemical analysis.

Concentrations of ionic species in solutions have long been determined by a known technique involving an ion-sensitive electrode and a reference electrode in contact with the solution. The electrodes constitute an electrochemical cell in which the half-cell potential at the reference electrode is substantially constant under standard temperature conditions and the half-cell potential of the ion-sensitive electrode is a function of the activity or concentration of the ionic species according to the well-known Nernst equation. Thus, the total potential between the electrodes is approximately proportional to the logarithm of the ionic activity and can readily be ascertained, usutlly with a high input impedance potentiometric device. A number of such ion-sensitive electrodes are known, such as the glass electrodes sensitive or responsive to $H^+$, $Na^+$, $K^+$, and others, typically non-glass electrodes e.g. the Ag-AgCl electrode sensitive to $Cl^-$.

It has also been found that a Nernstian response to divalent as well as monovalent ions in aqueous solution can be elicited by an electrode wherein the ion-sensitive surface is defined by a body of ion-exchange liquid, for example, a salt of a phosphoric acid ester dissolved in a solvent, such as decanol, which is substantially immiscible with water. Such electrodes are described in Belgian Patent No. 668,409.

In the use of this latter type of electrode certain problems arise. If the aqueous and organic phases are in massive contact with one another, relative to their volumes, a local layer depleted of the ions of the solution will arise at the interface due to the high rate of ion-exchange. Although this local depletion layer can be broken up by stirring, the latter is not always possible or complete; such local depletion layer is thus the source of possible errors known as stirring artifacts. Secondly, in any such ion-exchange process, the aqueous phases tend to become ultimately contaminated with ions from the exchanger. Further, because there is usually a finite solubility, albeit very small, of the exchanger in the aqueous phase, the exchanger in time will tend to leach out of the organic phase. Lastly, if the organic phase has ion-concentration gradients due to massive exchange at the interface, the potential measured by the electrode will exhibit instability.

In United States application, Serial No. 534,052, filed Mar. 14, 1966 and assigned to the same assignee as the present application, there has been disclosed and claimed, an electrode structure which overcomes a number of the foregoing problems. That structure incorporates means, in the form of a porous membrane having interconnected voids and being preferentially wettable by the ion-exchange liquid, for providing selective ion transfer between the two phases whilst maintaining the composition of ion-exchanger in the ion-exchange liquid in the membrane at a substantially constant level. However, such electrodes are difficult to make, particularly in small sizes where charging the electrode with ion-exchange liquid becomes a serious problem. Further, such electrodes must be used very carefully, in part at least because there is a tendency to entrap air bubbles at the membrane-test solution interface, thereby causing drift and spurious signals. The membrane seal which separates an internal electrolyte from the ion-exchange liquid also tends to create problems of leakage.

A principal object of the present invention is to provide an improved electrode of the ion-exchange liquid type using a porous membrane, which electrode is simple to construct and operate, and which overcomes the problems outlined above.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein:

FIG. 1 s an elevational view of a section through pertinent portions of an electrode incorporating the principles of the present invention;

Figure 1:
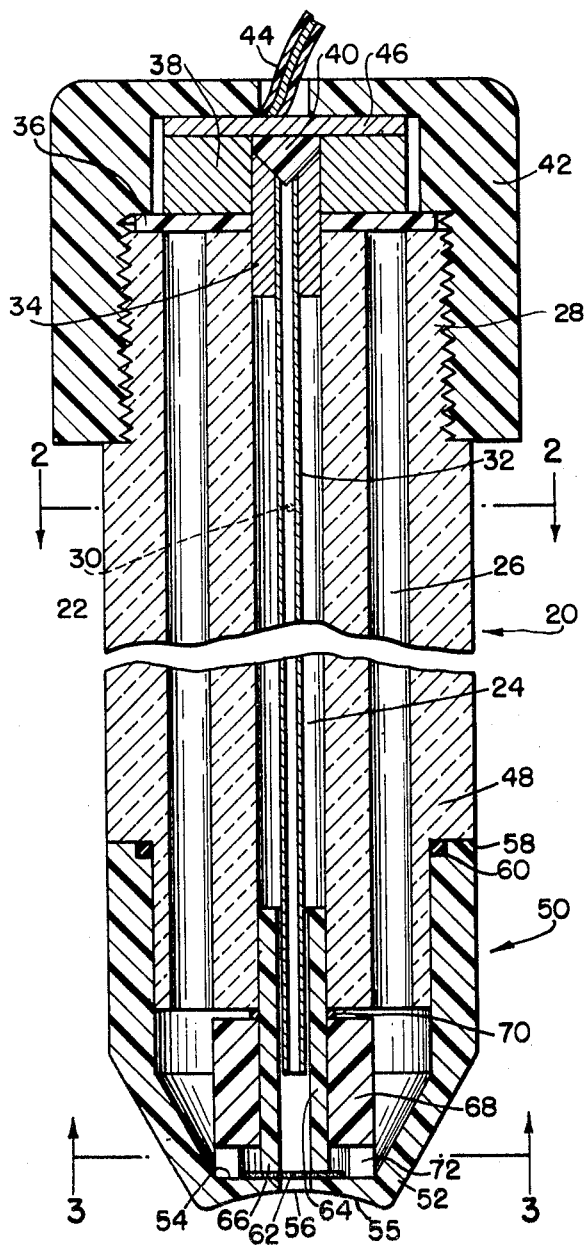
Figure 2:
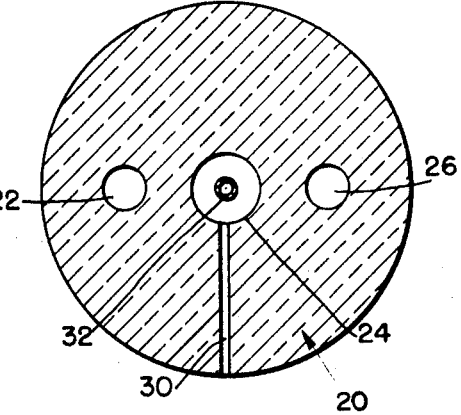
FIG. 2 is a cross-section of the embodiment of FIG. 1 taken along the line 2—2.

Referring now to FIGS. 1 and 2, there is shown a preferred embodiment of an improved electrode including an elongated electrode shell or body 20, preferably formed of an electrically insulating, substantially rigid material, such as glass, polytetrafluorethylene or the like, chemically inert to the reference electrolyte, the ion-exchange liquid and the test solution containing the ions to be determined. In the form shown, electrode body 20 is substantially solid and cylindrical, being penetrated from end to end by three passageways 22, 24, and 26 extending along the longitudinal dimension of the body. The three passageways preferably are straight, parallel to one another and lie approximately in a single plane such that passageway 24 is located between the others. The passageways can be readily formed by drilling out a solid cylinder or by casting the cylinder about mandrels. Adjacent upper end 28 of body 20 is vent passage 30 opening from the outer surface of body 20 into only passageway 24.

Positioned centrally within and extending well into central passageway 24 is hollow tubular, metallic reference electrode 32 open at both ends. The latter is dimensioned in cross-section to be of sufficiently small maximum diameter to fit loosely within passageway 24, i.e. so as to leave a substantial interspace between the outer surface of the reference electrode and the surface of passageway 24. Reference electrode 32 is suspended within body 20 only at one end of the latter, preferably by electrically conductive bushing 34. Bushing 34 preferably forms a sleeve tightly fitting around one end of reference electrode 32 or integral therewith. The external configuration of bushing 34 is such that it fits tightly within passageway 24 at end 28 of body 20 to form a plug for the passageway and has a portion thereof extending outwardly from the passageway. Typically, electrode 32 is a silver tube having, preferably adjacent the end opposite to bushing 34, a coating or mass of silver chloride bound thereon. In such case, the bushing is also preferably made of silver. Of course, other reference electrodes can be used in accordance with the teachings of the aforesaid Belgian patent, provided however that they can be made in hollow tubular configurations.

As means for sealing the ends of passageways 22 and 26 at end 28 of the body, there is further provided annular gasket 36, e.g. of polyvinylchloride or the like, positioned about central passageway 24 so as to cover passageways 22 and 26.

Centrally apertured, metallic (e.g. silver) washer 38 is mounted around and in electrical contact with bushing 34 so as to form a well in which is disposed plug 40. The periphery of end 28 of body 20 is externally threaded so as to be engageable by cap 42. The latter is centrally apertured to accommodate the usual electrical cable 44 which bears electrical contact plate 46 at one end thereof. Cap 42 is dimensioned such that when plate 46 is fitted therein and the cap is threaded onto body 20, plate 46 is brought into electrical contact with washer 38 and also with plug 40. This serves to exert pressure on the gasket underlying the washer and also on plug 40, thereby pressure-sealing passageways 22, 24, and 26 at their ends adjacent end 28.

The other end 48 of body 20 bears electrode tip 50. The latter is preferably a cup-shaped structure, typically formed of an electrically insulating material meeting the same requirements for chemical inertness as body 20, e.g. polytetrafluorethylene or the like. The bottom or "closed" portion of tip 50 is preferably shaped as truncated cone 52, the truncated portion having a flat surface 54 on the interior of the tip, and a dished or concave surface 55 curved toward the flat on the exterior of the tip. The truncated portion is pierced with circular aperture 56 opening at both dished surface 55 and flat surface 54. The periphery or edge of aperture 56 adjacent surface 55 is rounded. Tip 50 is dimensioned so that its open end fits tightly i.e. in sealed relation to end 48. Typically, this is achieved by providing end 48 with annular recessed shoulder 58 and shaping tip 50 to fit about end 48 in contact with shoulder 58. O-ring 60 is provided to fit between shoulder 58 and tip 50 thereby insuring that the latter two are sealed together. It will be seen that tip 50 is so dimensioned in depth as to allow substantial clearance between end 48 and surface 52.

Disposed on flat surface 52 in covering relation to aperture 56 is membrane 62. The latter is formed as a sheet of electrically insulating material substantially chemically inert to the ion-exchanger liquid, reference electrolyte and test solution which it is intended to contact. The membrane is further characterized in that it contains a multiplicity of voids or pores, which are preferably interconnected within the bulk of the membrane and a substantial number of which open upon the surfaces and edges of the membrane. The membrane is a material which is wetted by an organic liquid preferentially to an aqueous phase, i.e. the membrane material is organophilic. Typically, such membranes can be formed of cellulose acetate, polyethylene, polyvinylchloride, polyvinyl-acetate and the like. Such membranes are preferably quite thin, e.g. have a thickness lying approximately in the range between about 3 to 10 mil inches.

As means for maintaining the membrane in sealing relation across aperture 56 and for also separating passageway 24 from passageways 22 and 26 whilst permitting communication between the latter two, there is provided elongated, hollow, cylindrical retainer 64. The latter is dimensioned externally in cross-section to fit tightly into the end passageway 24 at end 48 of body 20 and internally in cross-section is of sufficient diameter to permit electrode 32 to fit therein with substantial clearance. Retainer 64 is sealed at one end within passageway 24 and extends outwardly therefrom, terminating in a substantially planar or flat cross-sectioned end 66.

Membrane 62 is preferably formed as a disk of larger diameter than the greatest dimension of aperture 56. Thus, retainer 64 is dimensioned so that when the device of the invention is assembled, the retainer bears against membrane 62, sealing the latter by pressure against surface 54 immediately surrounding aperture 56. The pressure holding membrane 62 should be sufficient to effect the seal but not so great as to crush the membrane and destroy the intercommunication amongst its pores.

Figure 4:
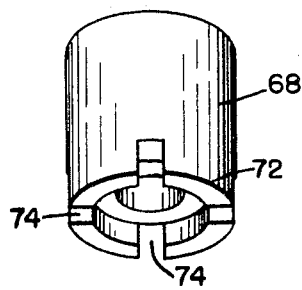
FIG. 4 is a perspective view of a portion of the embodiment of FIG. 1.
Figure 3:
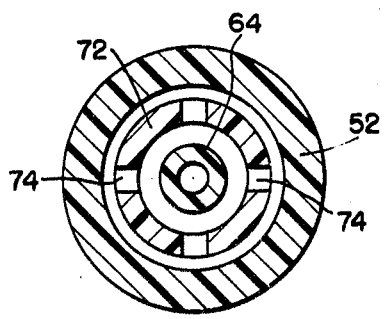
FIG. 3 is a cross-section of the embodiment of FIG. 1 taken along the line 3—3.

Lastly, the device preferably includes means, such as retainer guide 68, which serves a number of functions. Retainer guide 68 as shown particularly in FIG. 4 is an elongated cylindrical element mounted to form a tight seal around retainer 64. One end of guide 68 is adjacent end 48 of body 20 so as to hold O-ring 70 tightly therebetween. The other end of guide 68 is shaped as an annular crenellated ring 72 of the same external diameter as the remainder of the guide but with a greater internal diameter. Thus, ring 72 presents a series of radially extending slots 74 permitting communication between the interior and exterior of the guide. It will be seen that the internal diameter of ring 72 and the long dimension of guide 68 are great enough such that when the guide is in the final assembly, the crenellated portion of the ring abuts only surface 54 and the ring surrounds but does not contact membrane 62, thus leaving the edges of the latter quite open.

The electrode structure thus described has a number of advantages. For example, the internal aqueous reference electrolyte, typically a saturated solution of KCl, can be inserted readily into the structure. One need only unscrew cap 42 and remove plate 46 and plug 40. The electrolyte is injected into reference electrode 32, as with a hypodermic syringe, and fills the reservoir formed by passageway 24 as it spills out of the unsupported end of electrode 32. The electrolyte will fill the passageway without difficulty because the path provided by vent passage 30 allows air to leak out of passageway 24 as the electrolyte enters. After filling, if desired, passage 30 can readily be plugged as with wax or the like. It will be seen that electrolyte in passageway 24 contacts only the surface portion of membrane 62 opposite aperture 56, and is prevented from leaking out of passageway 24 by the seal provided primarily by retainer 64.

Similarly, one need only then remove bushing 38 and gasket 36 to expose passageways 22 and 26. Organic ion-exchanger liquid inserted into one of these latter passageways flows into the annular interspace between tip 50 and guide 68 and through slots 74 into contact with membrane 62. Of course, sufficient organic liquid will fill tip 50 around retainer 64 and guide 68, rising to fill the other of passageways 22 and 26. It will be apparent that the structure defined provides open-ended passageways which allow filling of both separate electrolyte and organic fluid reservoirs without any back-pressure of air, i.e. a pair of separated unitary fluid paths. There are thus two separate reservoirs for fluids which can contact one another only through the porous structure of the membrane.

The electrode assembly of the invention is employed by filling the central passageway with aqueous reference electrolyte and the two side passageways with organic exchanger liquid such as nonadecylphosphoric acid dissolved in dioctylphenylphosphonate, and then immersing tip 50 into an aqueous test solution in which for example, calcium ions are present. This will tend to trap an air bubble within concavity 55 but the latter advantageously is removed simply by tilting the electrode assembly or by washing out the bubble. Because the periphery of aperture 56 is rounded, the bubble will not tend to bind and will slip out readily. This structure insures the easy removal of entrapped gas adjacent the membrane.

It will be noted that because the porous membrane is also organophilic, a preferential liquid transport path is provided between the reservoirs of organic liquid and the two aqueous phases, and the membrane, acting as a wick, becomes filled with organic liquid. The pores of the membrane being of appropriate dimensions to provide capillarity which continually supplies the organic phase to the membrane, insure replacement of any organic liquid diffused into either aqueous phase and also allows the exchanger per se to diffuse into the membrane, replenishing any leaked into the aqueous phases. The preferential wetting of the membrane further tend to prevent the aqueous phases from displacing the organic phase in the membrane to any significant extent.

When the membrane of the electrode assembly, thus filled, is in contact with the test solution, a Nernstian potential will arise due to ion-xchange at the interface between the ion-exchanger liquid in the membrane and the test solution. As usual in the art, the test solution is also contacted with a reference half-cell, such as the well-known calomel electrode. The potential between the calomel electrode and the electrode assembly of the invention can be ascertained by an electrometric device, such as a vacuum tube voltmeter, and the Nernstian potential readily deduced therefrom as well known in the art.

Figure 5:
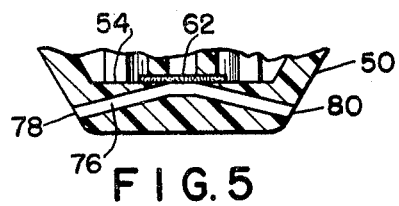
FIG. 5 is a cross-section of a fragment showing an alternative structure for use as an electrode tip in structures embodying the principles of the present invention.

The embodiment described in connection with FIG. 1 is intended for use as a "dipping" electrode in a fairly large body of test solution. However, the electrode assembly of the present invention is adaptable for use with much lesser quantities of test solution, simply by altering the configuration of tip 50 so that the assembly can be used as a "flow-through" electrode. In FIG. 5 there is shown a fragment of an electrode assembly wherein only the terminal portion of tip 50 is changed from FIG. 1. Here, tip 50 includes the same planar internal surface 54 and aperture 56 sealed with membrane 62. However, the tip does not have a concave outer surface as in FIG. 1, but instead aperture 56 extends internally of tip 50 into channel 76. The latter extends substantially transversely of the tip and opens on opposite sides of tip 50 at apertures 78 and 80. Channel 76 preferably is slightly angled or curved adjacent membrane 62 so that any air entrained in a fluid stream passing through the channel can become trapped at the bend of the channel and can readily be swept out as a bubble by increasing the stream velocity.

Since certain changes may be made in the above apparatus without departing from the scope of the invention herein involved it is intended that all matter contained in the above description or shown in the accompanying drawings shall be interpreted in an illustrative and not in a limiting sense.

We claim:

1. An electrode assembly for ion determination and comprising in combination:
    a body of electrically insulating material;
    a first reservoir within said body for containing a quantity of ion-exchanger liquid and having a filling channel thereinto through said body and a vent channel therefrom through said body;
    a second reservoir within said body for containing a quantity of reference electrolyte and having filling and vent channels communicating therewith through said body;
    a reference electrode extending into said second reservoir;
    an electrode tip adjacent one end of said body and having an aperture therein extending between internal and external surfaces of said tip, said aperture being adjacent both said reservoirs;
    a membrane of electrically insulating material having an interconnected porous structure, said membrane and body being of materials substantially chemically inert to either said electrolyte or ion-exchanger liquid and preferentially wettable by said liquid;
    means for sealing said membrane across said aperture at said internal surface;
    said membrane, aperture and reservoirs being so dimensioned that the portion of said membrane, substantially extending across said aperture, constitutes a wall of said second reservoir, the remainder of said membrane extending wholly into said first reservoir, and said porous structure of said membrane constitutes a liquid flow path between said reservoir.

2. An electrode assembly as defined in claim 1 wherein said first reservoir comprises an annular chamber disposed internally of said body adjacent said one end thereof and first and second elongated separate passageways extending substantially longitudinally within said body between the opposite end of said body and said annular chamber, and said second reservoir comprises a third elongated passageway within said body, separate from said other passageways and extending from said opposite end of said body and through said annular chamber to said membrane.

3. An electrode assembly as defined in claim 2 including means for sealing said elongated passageways at said opposite end of said body.

4. An electrode assembly as defined in claim 2 wherein said reference electrode is hollow and elongated and there are a first separate unitary fluid path along said reference electrode and through said second reservoir to an opening in the latter and a second separate unitary fluid path along said first passageway through said annular chamber and along said second passageway.

5. An electrode assembly as defined in claim 2 including means defining a common wall forming the inner periphery of said annular chamber and the outer periphery of a portion of said second reservoir, said means defining said common wall being in contact with said membrane under sufficient pressure to seal said membrane to said common wall and across said aperture without preventing capillary flow through the porous structure of said membrane of liquid in said first reservoir.

6. An electrode assembly as defined in claim 1 wherein said internal surface of said tip is substantially flat and has said membrane in contact therewith, said external surface being concave toward said aperture.

7. An electrode assembly as defined in claim 6 wherein the aperture edge at said concave surface is rounded.

9. An electrode assembly as defined in claim 1 wherein said reference electrode is a hollow, elongated tube extending through said vent channel of and into said second reservoir so as to constitute said filling channel.

References Cited

UNITED STATES PATENTS 3,070,539  12/1962  Arthur et al. _____ 204—195
3,088,905  5/1963   Glover _____ 204—195

JOHN H. MACK, Primary Examiner

T. TUNG, Assistant Examiner

U.S. Cl. X.R.

254—275